(No Model.)
P. CUNNINGHAM.
ROCKET.
No. 266,437. Patented Oct. 24, 1882.
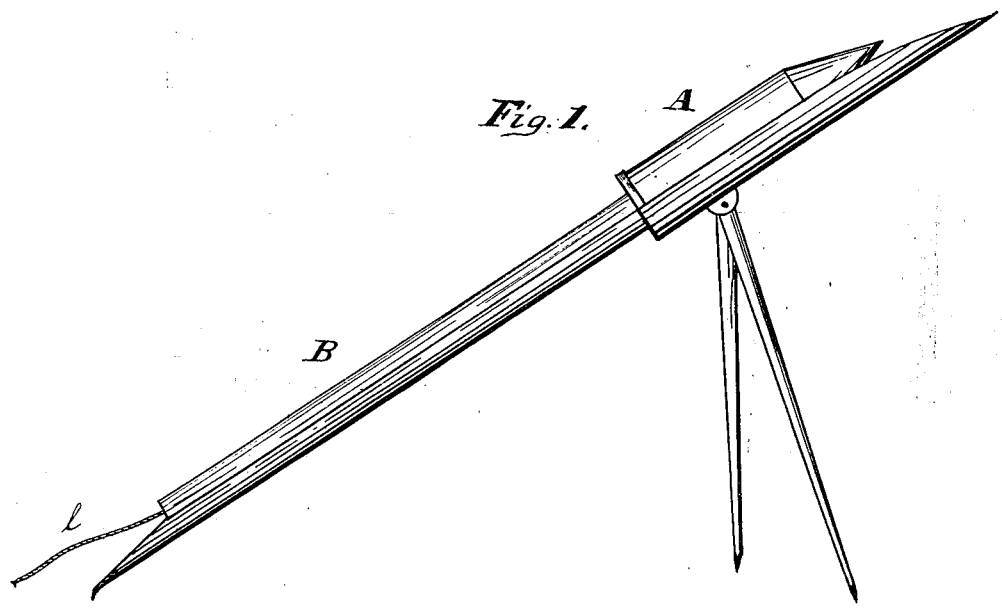
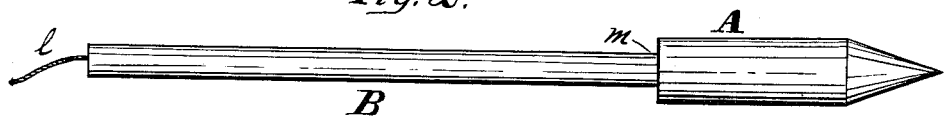
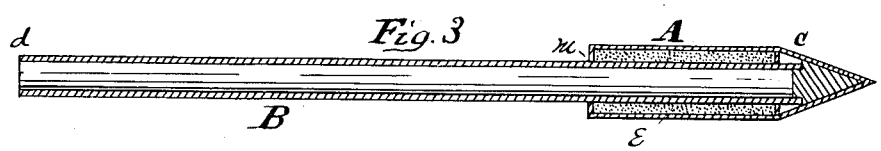
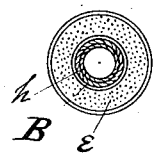
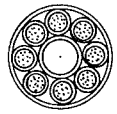
Attest
A. C. Fuller
James T. Cairns
Inventor
Patrick Cunningham
by R. W. Mason atty.

UNITED STATES PATENT OFFICE.

PATRICK CUNNINGHAM, OF NEW BEDFORD, MASSACHUSETTS.

ROCKET.

SPECIFICATION forming part of Letters Patent No. 266,437, dated October 24, 1882.

Application filed February 6, 1882. (No model.)

*To all whom it may concern:*

Be it known that I, PATRICK CUNNINGHAM, a citizen of the United States, residing at New Bedford, county of Bristol, and State of Massachusetts, have invented a new and useful Improvement in Rockets for Throwing Lines, designed to be used in the Life-Saving Service, of which the following is a specification.

My invention relates to improvements in that class of rockets which are designed to carry a line from the shore to a ship in distress, and has for its object to provide an apparatus by which a line can be carried to a great distance with accuracy.

To this end my invention consists in constructing a rocket whose tail is a tube, in which tube is coiled the line to be carried, and around the front end of which tube is arranged the receptacle for holding the rocket composition.

In the accompanying drawings, in which like letters indicate like parts, Figure 1 is a side elevation of my improved rocket resting in a suitable rocket-stand, and showing the ground end of the line protruding from the rear end of the tube in which the line is coiled. Fig. 2 is a side view of my improved rocket as it appears when not resting in the rocket-stand. Fig. 3 is a longitudinal sectional view of my improved rocket. Fig. 4 is a view of a cross-section of the head of the same, showing the rocket composition arranged around the tube in a continuous mass. Fig. 5 shows a different method of arranging the rocket composition—*i. e.*, in separate compartments, instead of one continuous mass.

In Fig. 2 A is the head of the rocket, which head contains the rocket composition, which is provided with a suitable fuse at $m$. B is the tube in which the line is coiled, and which also forms the tail of the rocket. $l$ is the ground end of the line.

Fig. 3 clearly shows the construction of the rocket. The line occupies the whole of the tube B from $c$ to $d$, being coiled therein. A is the receptacle for the rocket composition, which composition is represented by E.

In the cross-sectional view, Fig. 4, $h$ represents a section of the line coiled in the tube B, and E is the rocket composition around said tube.

By arranging the rocket composition around a center in the manner shown the rocket maintains a direct course, and by coiling the line in the tube, so that the rocket carries the line with it in its flight and pays it out as it advances, the rocket is enabled to make the same direct and unimpeded flight that a projectile does when fired from a gun.

Having thus described my invention, what I claim, and desire to secure by Letters Patent, is—

The rocket constructed as herein shown and described, with the head A, a tube, B, secured within said head and extending to the rear to form the tail, and the intervening space between said tube and the inner wall of the head filled with rocket composition.

PATRICK CUNNINGHAM.

Witnesses:
F. A. MILLIKEN,
GEO. F. TUCKER.